US008645666B2

(12) United States Patent
Glew

(10) Patent No.: US 8,645,666 B2
(45) Date of Patent: Feb. 4, 2014

(54) MEANS TO SHARE TRANSLATION LOOKASIDE BUFFER (TLB) ENTRIES BETWEEN DIFFERENT CONTEXTS

(75) Inventor: Andy Glew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1974 days.

(21) Appl. No.: 11/647,894

(22) Filed: Dec. 28, 2006

(65) Prior Publication Data

US 2008/0162868 A1    Jul. 3, 2008

(51) Int. Cl.
*G06F 12/00* (2006.01)
(52) U.S. Cl.
USPC ............................................ 711/207; 711/154
(58) Field of Classification Search
USPC .................................................. 711/154, 207
See application file for complete search history.

(56) References Cited

U.S. PATENT DOCUMENTS

| 5,613,083 | A | 3/1997 | Glew et al. |
| 6,728,858 | B2 | 4/2004 | Willis et al. |
| 7,073,044 | B2 | 7/2006 | Willis et al. |
| 7,124,273 | B2 | 10/2006 | Glew et al. |
| 7,165,164 | B2 | 1/2007 | Willis et al. |
| 7,194,597 | B2 | 3/2007 | Willis et al. |
| 2005/0080934 | A1 | 4/2005 | Cota-Robles et al. |
| 2005/0080937 | A1 | 4/2005 | Cota-Robles et al. |
| 2006/0101227 | A1* | 5/2006 | Willis et al. .................. 711/205 |
| 2007/0067505 | A1 | 3/2007 | Kaniyur et al. |

OTHER PUBLICATIONS http://groups-beta.google.com/group/comp.arch/browse_frm/thread/7a82827d5f472d22/fe6d4936ab050afa?q=glew+TLB+sharing+group:comp.arch#fe6d4936ab050afa.
http://groups-beta.google.com/group/comp.arch/browse_frm/thread/a877ab380160c059/06b992790f4babac?q=glew+TLB+sharing+group:comp.arch#06b992790f4babac.

* cited by examiner

*Primary Examiner* — Matthew Bradley
(74) *Attorney, Agent, or Firm* — Lowenstein Sandler LLP

(57) ABSTRACT

A method and apparatus for sharing translation buffer entries between multiple processing resources is herein described. A sharing field in a translation entry is to represent that the translation entry is to be associated with/shared between a plurality of processing resources, if the translation entry is determined to be the same for the plurality of processing resources. Upon a miss to a translation buffer associated with a first resource, a new translation for the first resource is completed. The new translation is compared to other entries in the translation buffer to determine if any other entries include the same translation for other resources. In response to determining other resources are associated with the same translation, a sharing field in a translation entry is to indicate which resources the entry is to be associated with/shared between.

22 Claims, 5 Drawing Sheets

Translation Table 200

| 210 { Bit 211 | Bit 212 | Virtual/Linear Address 215 | Physical Address 220 | Other 225 | 205 |
|---|---|---|---|---|---|
| | | 250 | | | |
| | | 260 | | | |
| | | 270 | | | |
| | | 280 | | | |

FIG. 2

MEANS TO SHARE TRANSLATION LOOKASIDE BUFFER (TLB) ENTRIES BETWEEN DIFFERENT CONTEXTS

FIELD

This invention relates to the field of processor addressing and, in particular, to efficiently sharing address translations between different processing resources.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of processing resources, such as cores, threads, and/or logical processors.

Each of the processing resources is typically associated with a virtual or linear address space, which translates into a portion of physical system memory. As an example, a page table structure is utilized to translate virtual addresses into physical addresses. Usually, in a page table structure, a page table base register (PTBR) stores a base address for a processing resource. As a result, each processing resource potentially includes a different linear address view of physical memory. However, in many circumstances, a portion or all of a processing resource's virtual address space overlaps with other processing resources. For example, different types of sharing include shared objects that have the same virtual address in multiple address spaces and shared object that have different virtual address spaces in multiple address spaces.

Because traversing a memory data structure, such as a page table, is expensive, hardware mechanisms, such as a translation buffer, are used to store recent translations. Previously, when a translation buffer is shared between processing resources, a portion of the translation buffer is dedicated to each resource or the entire translation buffer is open to each resource, but only associates a single entry with a single processing resource. As a result, expensive translations are potentially conducted for one resource, when the same translation exists in the translation buffer for another resource.

As an example, a first processing resource accesses a translation buffer to obtain a translation for a first virtual address. If a translation for the first virtual address associated with the first processing resource is not present, a miss to the translation buffer occurs and the expensive translation is done. Yet, if a second virtual memory space for a second processing resource overlaps a first virtual address space for the first processing resource, the correct translation of the virtual address may be present in the translation buffer, but associated with the second resource. However, since current translation buffers do not share access to entries, the expensive page table translation is conducted instead of allowing hardware to share an existing translation entry.

BRIEF DESCRIPTION OF THE DRAWINGS

The present invention is illustrated by way of example and not intended to be limited by the figures of the accompanying drawings.

FIG. 2 illustrates an embodiment of a translation buffer capable of sharing translation buffer entries (TBEs) among a plurality of processing resources.

DETAILED DESCRIPTION

In the following description, numerous specific details are set forth such as examples of specific hardware support for enabling reads of translation buffer entries and sharing translation buffer entries among processing resources, specific processor organization, specific translation buffer usage, etc. in order to provide a thorough understanding of the present invention. It will be apparent, however, to one skilled in the art that these specific details need not be employed to practice the present invention. In other instances, well known components or methods, such as translation buffer circuitry/implementation, page table data structures, resource identification, decoding, and specific operational details of microprocessors, have not been described in detail in order to avoid unnecessarily obscuring the present invention.

The method and apparatus described herein are for sharing translation buffer entries, which is also abbreviated buffer entries, between different contexts. Specifically, sharing translation entries is primarily discussed in reference to a microprocessor with virtual to physical address translation entries to illustrate basic operation. However, the methods and apparatus for sharing translation entries are not so limited, as they may be implemented on or in association with any integrated circuit device or system, such as cell phones, personal digital assistants, embedded controllers, mobile platforms, desktop platforms, and server platforms, as well as in conjunction with any type of address translation buffer, such as buffer to store translations of physical addresses to other physical addresses. In addition, the techniques below may be utilized with other translation buffer entries, such as in conjunction with ASIDs or VMIDs to allow translation buffer entries to survive address space changes and enabling sharing of translations among resources.

Figure 1:
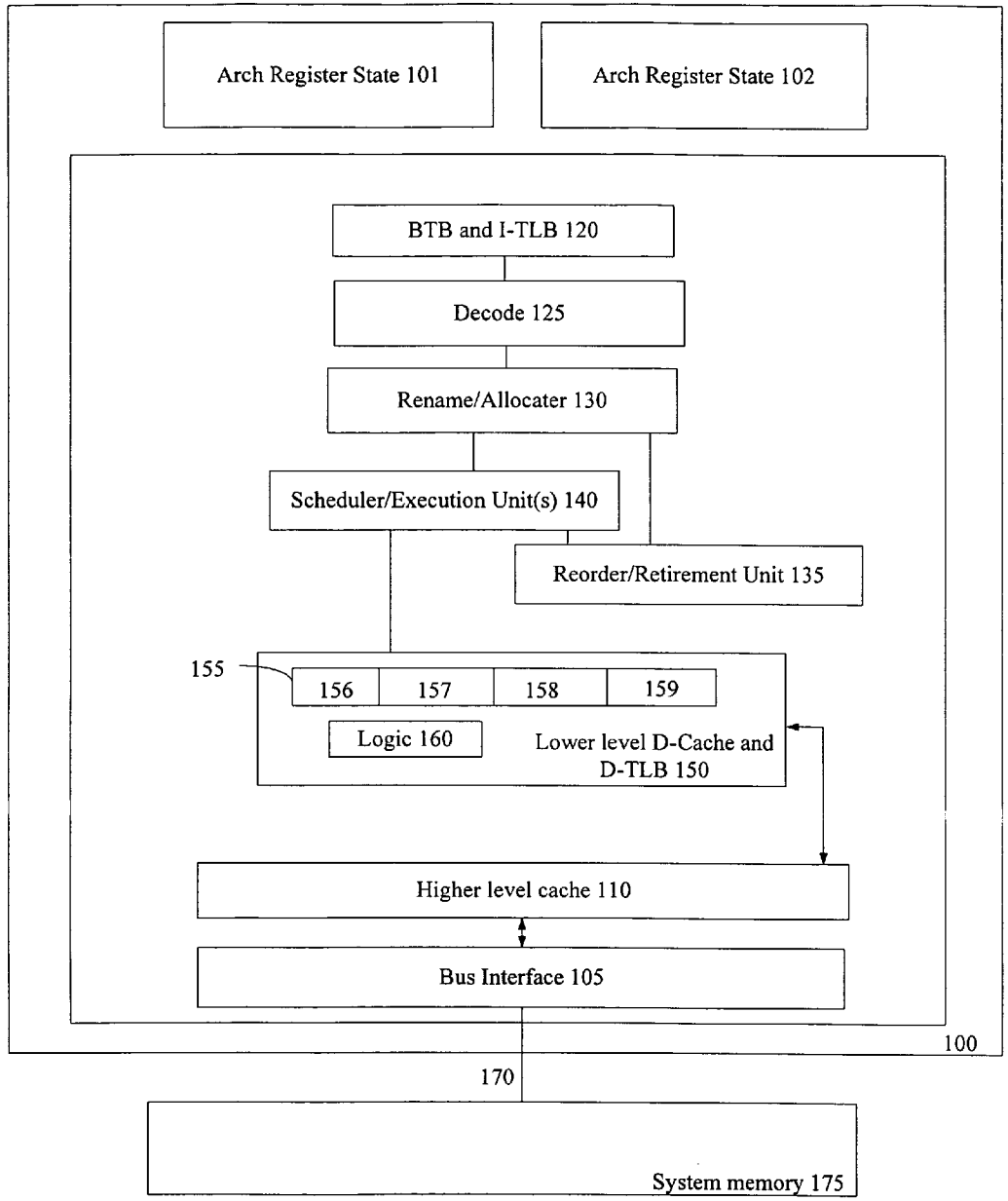
FIG. 1 illustrates an embodiment a processor capable of sharing translation buffer entries among hardware threads.

Referring to FIG. 1, an embodiment of a processor capable of sharing translation buffer entries between processing resources is illustrated. A processing resource refers to a thread, a process, a context, a virtual machine, a logical processor, a hardware thread, a core, and/or a processor, which shares access to a translation buffer and potentially includes a different linear/virtual view of physical memory. A physical processor typically refers to an integrated circuit, which potentially includes any number of other processing resources, such as cores or hardware threads.

A core often refers to any logic located on an integrated circuit capable of maintaining an independent architectural state, such as arch state 101 and 102, wherein each independently maintained architectural state is associated with at least some dedicated execution resources. Therefore, each core is typically associated with an individual virtual/linear address space, which may be separate, partially overlap, or fully overlap another resources address space. Note that the same virtual address space, i.e. fully overlapping, is potentially differently named but the same virtual address space.

In contrast to cores, a hardware thread typically refers to any logic located on an integrated circuit capable of maintaining an independent architectural state, wherein the independently maintained architectural states share access to execution resources. As can be seen, when certain processing resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. As above with a core, a hardware thread potentially also has individual linear/virtual address spaces, which may partially or fully overlap.

In addition, in one embodiment, each hardware thread or core is capable of executing multiple threads. As a first example, a single core includes multiple hardware threads to execute multiple threads. Here, each logical processor, whether a hardware thread on a multithreaded core, or a single threaded core, potentially has a separate virtual memory address space. A hardware thread is typically associated with a single virtual address space, and potentially switches to different virtual address spaces at different times. Different hardware threads may have the same virtual address space, either simultaneously or at different times.

Therefore, a processing resource includes any of the aforementioned resources, such as cores, threads, hardware threads, virtual machines, or other resources, that share access to a translation buffer.

In one embodiment, processor 100 is a multi-threaded processor capable of executing multiple threads in parallel. Here, a first thread is associated with architecture state registers 101 and a second thread is associated with thread 102. Therefore, below thread 101 and 102 refer to the first and second threads, respectively. Thread 101 and 102 share access to translation lookaside buffer 150. Here, architecture state registers 101 are replicated as architecture state registers 102, so individual architecture states are capable of being stored for logical processor 101 and logical processor 102. Other smaller resources, such as instruction pointers, renaming logic in rename allocater logic 130, ILTB 120 may also be replicated for threads 101 and 102. Other resources, such as re-order buffers in reorder/retirement unit 135, load/store buffers, and queues may be shared through partitioning. While resources, such as general purpose registers, page-table base register, low-level data-cache and data-TLB 150, execution unit(s) 140, and out-of-order unit 135 are potentially fully shared.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage.

Bus interface unit 105 is to communicate with devices external to processor 100, such as system memory 175, a chipset, a northbridge, or other integrated circuit. Typically bus interface unit 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode instructions. Logic 120 includes a branch target buffer to predict branches to be executed/taken and an instruction-translation buffer (I-TLB) to store address translation entries for instructions. Here, a processor capable of speculative execution potentially prefetches and speculatively executes predicted branches. In one embodiment, the I-TLB is capable of sharing entries between logical processor 101 and 102, as discussed in reference to D-TLB 150 below.

Decode unit 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, thread 101 is potentially capable of out-of-order execution, where allocator and renamer block 130 also reserves other resources, such as a reorder buffer to track instructions. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. Previously, a D-TLB entry includes a virtual address, a physical address, and other information, such as an offset, to provide inexpensive translations for recently used virtual memory addresses.

In one embodiment, D-TLB is shared between thread 101 and thread 102, and each entry within D-TLB is capable of being shared between thread 101 and 102. Here, D-TLB entry 155 includes sharing field 156 to indicate if entry 155 is associated with thread 101, thread 102, or both, virtual address field 157 to store a virtual address, field 158 to store a translated physical address, and field(s) 159 to store other information, such as an offset, reference to a page table base register (PTBR), page directory entry (PDE), page table entry (PTE), or other information.

Logic 160 is to determine if an entry is present in the D-TLB upon request. For example, a request for a translation of a virtual address associated with thread 101 is received by the D-TLB. Logic 160 reads the D-TLB to determine if an entry referencing the virtual address in field 157 and associated with the thread 101 in sharing field 156 is present. Note, that an entry in the D-TLB, such as entry 155 may be associated with both thread 101 and 102, if the translation of the virtual address referenced in field 157 is the same for both threads 101 and 102.

In one embodiment, in response to a miss, i.e. when no translation entry references the virtual address being associated with thread 101, logic 160 performs a new translation. For example, a multi-level page table structure is used for virtual memory translation. Here, thread 101 and thread 102 each have a page table base register (PTBR). Typically in the Intel x86 family of process, a PTBR is referred to as CR3. Each PTBR stores an address/reference to a page directory for a process/context currently executing on a corresponding thread. The virtual address references a page directory entry (PDE) within the page directory, a page table entry (PTE) within a page table referenced by the PDE, and potentially an offset value. The PDE and PTE, i.e. page table data structure, is walked to translate the virtual address to a physical address.

Logic 160 also reads the D-TLB to determine if a second entry referencing the virtual address associated with thread 102 is present. If it is, the new translation is compared against the second entry, to determine if the translation of the virtual address is the same for thread 101 and 102. When the translation is the same, a single entry is capable of being shared between the two threads, which is denoted in sharing field 156. In one embodiment, the entire translations is the same to be shared among the two threads. Therefore, upon a subsequent read to the D-TLB for translation of a virtual address referenced in field 157 for either thread 101 or 102, entry 155 is capable of inexpensively providing the translated physical address.

In FIG. 1, processor 100 is illustrated as a microprocessor with two logical processors, i.e. two hardware threads, where D-TLB in block 150 is capable of storing entries shared between the two hardware threads. However, processor 100 is not so limited. For example, processor 100 may be any processing element, such as an embedded processor, cell-processor, microprocessor, or other known processor, which includes any number of multiple cores/threads capable of executing multiple contexts, threads, virtual machines, etc. As an example, in a processor where four resources, such as four threads, share a translation buffer, sharing field 156 is to represent sharing/association between any combination of the four resources. Moreover, an oversimplified illustrative microarchitecture of an out-of-order of processor is illustrated for processor 100. However, any of the units illustrated in processor 100 may be configured in a different order/manner, may be excluded, or may overlap one another.

In addition, any style of translation buffer shared by two resources potentially implements sharing of entries between the resources, and is not limited to processing resources sharing a data-translation lookaside buffer on a microprocessor. As a first example, a higher-level TLB or an I-TLB is capable of sharing entries between resources. Other examples include a translation buffer for I/O address to system/memory address translation on a controller hub, a translation buffer to translate permission information, a translation buffer to translate guest physical addresses to host physical addresses in a virtual machine, or any other buffer to associate one reference with a second reference in a table/buffer.

Turning to FIG. 2, an embodiment of a translation table is illustrated. Translation table 200 includes a plurality of entries, such as entries 205, 250, 260, 270, and 280. Examples of translation table 200 include a data-translation look aside buffer (D-TLB) to store translations of virtual addresses to physical addresses, an instruction-translation lookaside buffer (I-TLB) to store translations of virtual addresses to physical addresses, an I/O translation table to translate I/O addresses to system addresses, a protection lookaside buffer (PLB) to store translations of address/bit patterns to access/protection levels, and a physical translation table to translation physical addresses to other physical addresses.

In one embodiment, translation table 200 is a translation lookaside buffer (TLB) shared by a plurality of processing resources. Examples of processing resources include a thread, a process, a context, a virtual machine, a logical processor, a hardware thread, a core, and a processor. In one illustrative embodiment, translation table 200 is shared by two threads. Entry 205 includes sharing field 210 to represent which of the two threads entry 205 is associated with. Here, sharing field 210 includes two bits, bit 211 and bit 212.

To illustrate, assume table 200 is shared by hardware threads 101 and 102 from FIG. 1. Bit 211 is associated with thread 101 and bit 212 is associated with thread 102. In one embodiment, bits 211 and 212 are associated with threads 101 and 102, respectively, through a decoder, as discussed below in reference to FIG. 3. When bit 211 is set, entry 205 is associated with thread 101, and when bit 212 is set, entry 205 is associated with thread 102. When a translation of a virtual address stored in field 215 is the same for both threads 101 and 102, then both bits 211 and 212 are set to associate entry 205 with both threads 101 and 102, i.e. shared between both threads.

As an example, a first virtual address is referenced by thread 102. Assuming there is no corresponding translation in TLB 200 at that time, i.e. a TLB miss occurred, then the first virtual address is translated for thread 102. In a page table data structure, the page table base register (PTBR) for thread 102 in combination with the first virtual address results in a translation to a physical address through a page directory entry (PDE) and a page table entry (PTE). The first virtual address is stored in virtual/linear address field 215, the translated physical address is stored in physical address field 220, and any other information, such as offset information, is stored in other field 225. In addition, bit 212 is set to represent that entry 205 is associated with thread 102.

In one embodiment, setting bit 212 includes masking a logical value into bit 212's position within entry 205. For example, if bit 212 is in a default logical zero state to represent that entry 205 is empty or not associated with thread 102, then a logical one value is masked into bit 212 to represent entry 205 is associated with thread 102. Next, assume thread 101 references the first virtual address stored in entry 205. TLB 200 is read, but bit 211 is not set in entry 205; therefore, entry 205 is not associated with thread 101 at that time. Consequently, a miss to TLB 200 occurs. A new translation for the first virtual address is completed utilizing a PTBR for thread 101. The new translation is compared to entry 205.

In one embodiment, comparing the new translation to entry 205 includes comparing all of entry 205, except sharing field 210 or other resource ID field, with the corresponding fields of the new translation. For example, if the virtual addresses are the same, the physical address stored in field 220 and the newly translated physical address for thread 101 are the same, and other field 225 and the corresponding other information in the new translation are the same, when compared, it is determined that the translations match, i.e. entry 205 is the same for both thread 101 and 102. If the new translation and entry 205 match, then a second entry is stored in TLB 200. In one embodiment, storing a second entry includes storing an entry in another location in TLB 200, such as at entry 250, with bits 211 and 212 both set. In another embodiment, storing a second entry includes setting bit 211 in entry 205 to associate entry 205 with both thread 101 and 102.

Translation buffer 200 may be organized in any manner, such as a fully associative buffer, a set associative buffer, or directly mapped buffer. As illustrated, bits 211 and 212 are present in a content portion of TLB 200, i.e. sharing field 210 is CAMed in entry 205. However, bits 211 and 212 may be present elsewhere and associated with entry 205. For example, sharing field 210 is placed in a portion of a tag array associated with entry 205 used to index TLB 200. Also note, when a processor includes more than two processing resources, bits in sharing field 210 may be added to correspond to the additional processing resources. In addition, search algorithms and/or selective comparison may be used to determine which processing resource entries to select for comparison against new translations.

Figure 3:
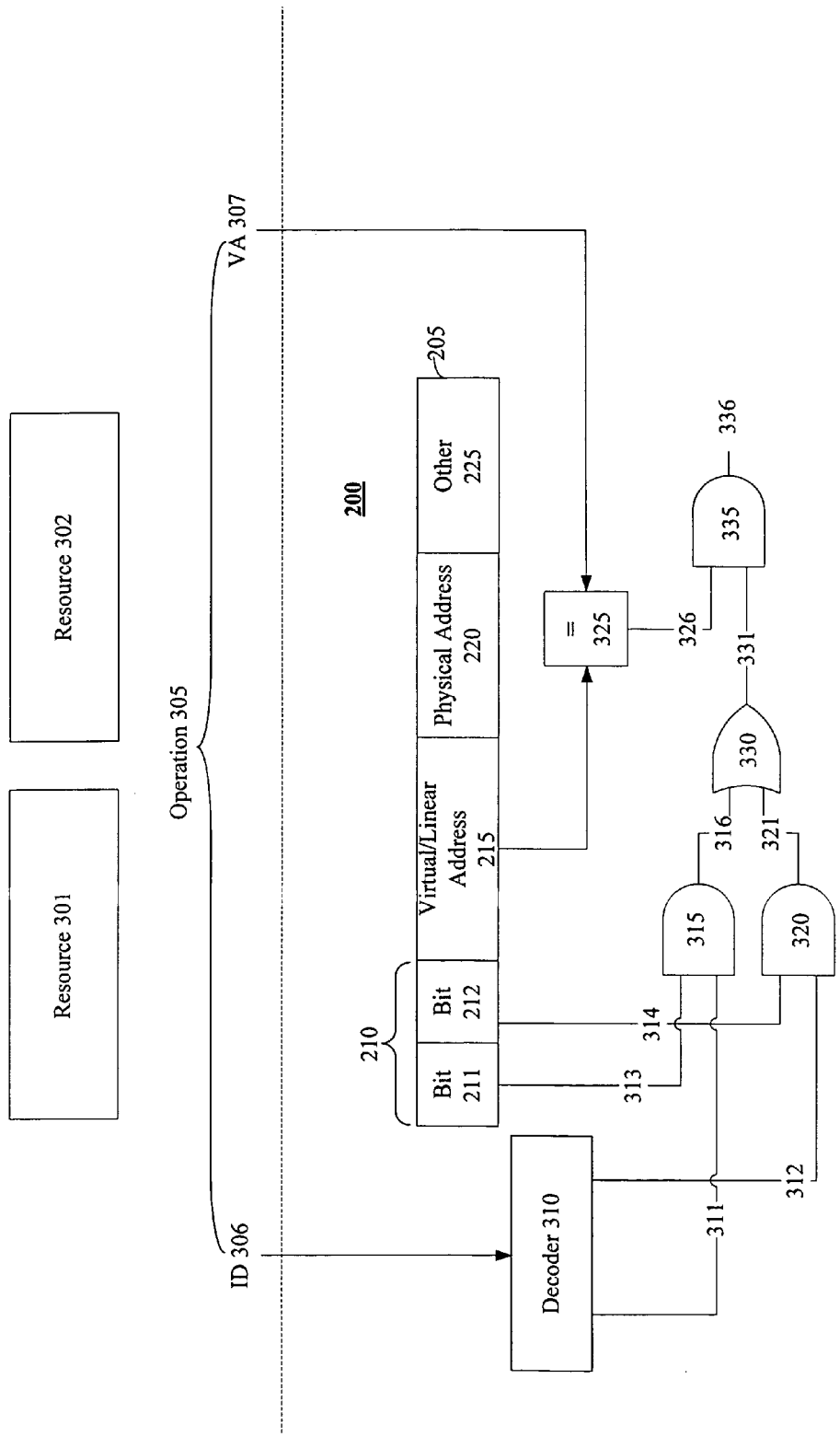
FIG. 3 illustrates an embodiment of logic in a translation buffer capable of enabling reads of shared buffer entries.

Turning to FIG. 3, an embodiment of logic in TLB 200 to enable read out of a translation entry is illustrated. In one embodiment, a resource identifier is stored in each translation buffer entry (TBE), such as entry 205, to associate a TBE with a processing resource. In another embodiment, a decoder, such as decoder 310, associates processing resources, such as resources 301 and 302, with an entry, such as entry 205 through an encoded ID As an illustrative example, assume processing resource 301 initiates operation 305, which includes reference to virtual address 307. Resource ID 306, which is either supplied externally to TLB 200 or attached within TLB 200, is input into decoder 310.

Decoder 310 converts an encoded ID into a decoded representation to identify a requesting resource. Essentially a bitmask is operation is performed to match translation buffer entries with N resources. In one embodiment, first decoder output 311, by default, is in a first logical state, such as a logical zero, and is set to a second logical state, such as a logical one, in response to receiving a resource ID identifying resource 301. Here, decoder 310 takes an encoded ID associated with resource 301 and outputs a 10 on outputs 311 and 312, respectively. Similarly, decoder output 312 is set in the same manner in response to receiving a resource ID referencing resource 302 on input 306. Continuing the example, decoder output 311 is combined with bit 211 through input 313 in first logical operator 315. In one example first logical operator 315 includes an AND operation. Here, when decoder output 311 and bit 211 are set to a logical one, output 316 is set to a logical one. Essentially, when a first resource ID referencing resource 301 is received and bit 211 is set to associate entry 205 with resource 301, then a read of entry 205 in response to the request is enabled, as long as the virtual address of the request and entry 205 match, as discussed below. In other words, when bit 211 is set entry 205 is associated with resource 301 through comparing decoder output 311 and bit 211.

Similar to the discussion above, bit 212 and second decoder output 312 are combined in second operator 320. If entry 205 is to be associated with resource 302, then bit 212 is set. As a result, when line 312 is set to a logical one in response to receiving a resource ID associated with resource 302, logic 320 enables entry 205 to be read out in response to request/operation 305. If bits 211 and 212 are not set, then first logical output 316 and second logical output 321 are not set. As a result, third logical output 331 is not set, so entry 205 is not enabled to be read out in response to request 305, whether or not virtual address 307 matches the virtual address stored in field 215.

However, if either first logical output 316 or second logical output 321 are set, then third logical output 331 is set to enable a read of entry 205, as long as virtual address 307 and a virtual address stored in field 215 are the same. To illustrate, assume a translation of a first virtual address for thread 301 is stored in entry 205. As a result, bit 211 is set to associate entry 205 with thread 301. Next, request 305, which is associated with thread 301 is received. Thread ID 306, which identifies thread 301, is input into decoder 310. Decoder 310 sets first decoder output 311 to a logical one. Bit 211 and first decoder output 311 are input into AND gate 315 to set first logical output 316 in response to both inputs being set. OR gate 330 sets output 331 in response to input 316 being set. The first virtual address stored in field 215 is compared to request 305's virtual address 307. If the virtual addresses are the same, then comparator output 326 is set. Consequently, AND gate 335 sets enable signal 336 to enable read out of entry 205. Essentially, TLB 300 is read to determine if a virtual address to be translated is present in an entry associated with the requesting thread. Here, thread 301 requested a translation of a first virtual address. Entry 205 is determined to include the first virtual address in field 215, which is associated with thread 301 through bit 211. Therefore, the previous translation of the first virtual address stored in entry 205 is able to be read out in response to request 305. Note that if both bits 211 and 212 are set, entry 205 is capable of being read in response to a request from either thread 301 or 302. In that case, entry 205 is shared between resources 301 and 302.

Figure 4:
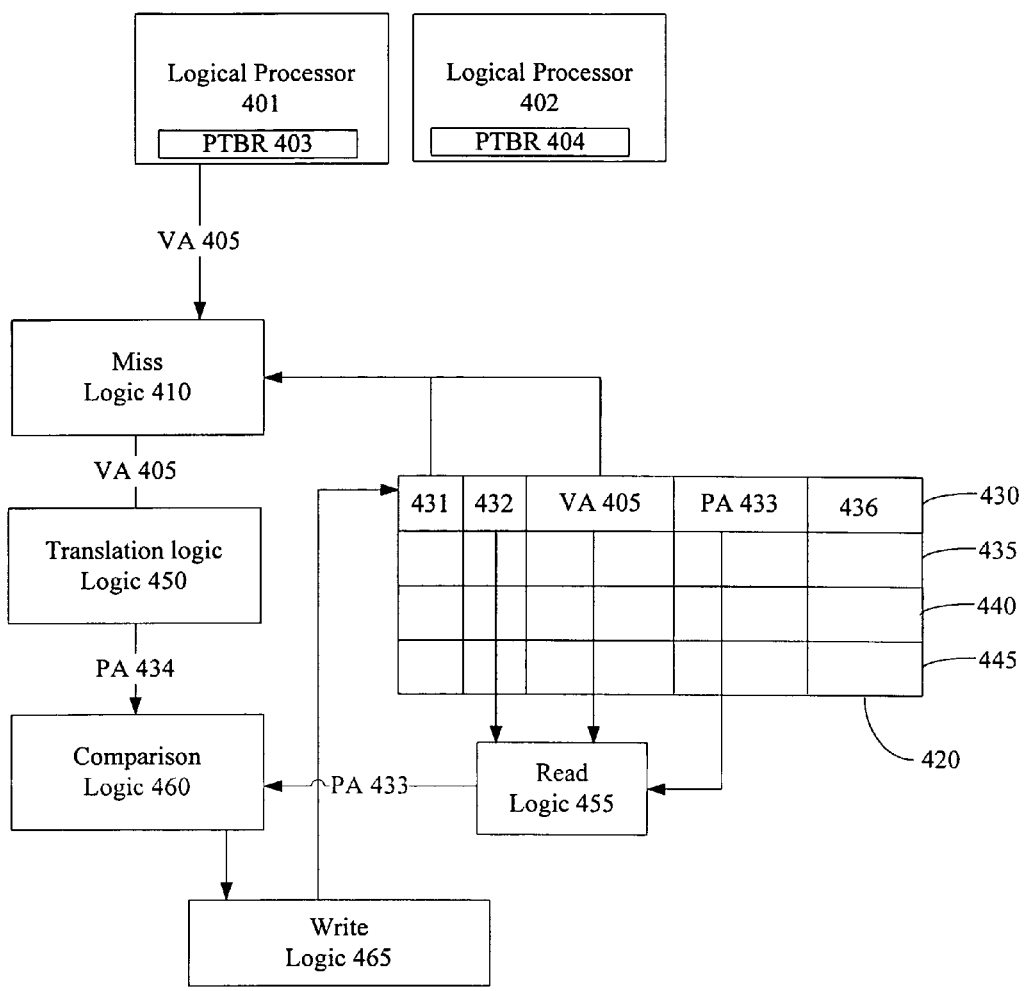
FIG. 4 illustrates an embodiment of logic in a translation buffer capable of associating a buffer entry with at least two logical processors.

Referring next to FIG. 4, an embodiment of logic in a microprocessor for supporting sharing of translation buffer entries between a plurality of logical processors is illustrated. Here, microprocessor 400 includes logical processors 401 and 402. Logical processors 401 and 402 include any processing resource that shares access to translation buffer 420, which potentially results in different physical addresses from translation of the same virtual address. Examples of logical processors 401 and 402 are threads, hardware threads, contexts, and cores.

Logical processor 401 includes Page Table Base Register (PTBR) 403. PTBR 403 is to store a base for a virtual address space associated with logical processor 401, i.e. how logical processor 401 views physical memory in a linear or virtual fashion. In a page table structure, PTBR 403 is to store a reference to a Page Directory Entry (PDE). The Page Directory Entry (PDE) is to store references to Page Table Entries (PTE), while the Page Table Entries are to store references to physical addresses. As an example, a virtual address includes three fields: a PDE field, a PTE field, and an offset field. Similar to PTBR 403, PTBR 404 is used to determine a virtual address space for a current context/process executing on logical processor 402.

In some circumstances, all or some of the virtual address space of logical processor 401 and logical processor 402 overlap. In one embodiment, contexts/processes executing on logical processor 401 share the same virtual address space. Furthermore, contexts/processes executing on logical processor 401 potentially share at least some of the same virtual memory address space as contexts/processes executing on logical processor 402. As a result, some translations of virtual addresses for logical processor 401 are the same as translations for logical processor 402. To illustrate, FIG. 4 depicts an example of a miss to translation buffer 420 associated with logical processor 401, and in response to the miss, associating entry 430 with both logical processor 401 and 402 when the translations for both logical processors match.

Here, logical processor 401 generates a request to translate virtual address (VA) 405 to a physical address. As an example, a request to translate VA 405 potentially includes a reference to a VA address location of an instruction or a data element. In response to missing a virtually indexed cache or accessing a memory storing physical addresses, a translation is requested from TLB 420. VA 405 is provided to miss logic 410. In one embodiment, miss logic 410 is included in a page miss handler module. In another embodiment, a page miss handler unit includes miss logic 410, translation logic 450, comparison logic 460, read logic 455, write logic 465, or any combination thereof.

Miss logic 410 reads translation buffer 420 to determine if an entry associated with logical processor 401 includes a reference to virtual address 405. Here, miss logic 410 reads first bit 431 and virtual address 405 in entry 430 to see if entry 430 includes a reference to virtual address 405 and is associated with logical processor 401. In one embodiment, the logic illustrated in FIG. 3 is included in miss logic 410 to determine if entry 430 references VA 405 and corresponds to logical processor 401.

In this example, assume that bit 431 is not set initially, which indicates that entry 430 is not associated with logical processor 401 at that time. In that case, a miss to translation buffer 420 occurs. In response to the miss, translation logic 450 translates virtual address 405 into a physical address to form a new translation. In one embodiment, the translation is done using a page table structure as discussed above utilizing PTBR 403. Also in response to the miss, read logic 455 is to determine if an entry, such as entry 430, includes virtual address 405 and is associated with logical processor 402. Here, assume bit 432 is set to indicate that entry 430 is associated with logical processor 402. In one embodiment, read logic 455 and miss logic 410 include at least some of the same logic, which is similar in operation to the logic illustrated in FIG. 3. Therefore, since bit 432 is set and virtual address 405 is present in entry 430, logic 455 determines entry 430 includes virtual address 405 and is associated with logical processor 402.

As a result, comparison logic 460 compares physical address 433 with new physical address 434, which was translated above in translation logic 450. In another embodiment, all of translation entry 430, including other information field(s) 436, is compared in comparison logic 460 to the new translation, to determine if translation entry 430 matches the new translation. If the new translation for logical processor 401 does not match translation entry 430, then write logic 465 writes a new separate entry in translation buffer 420, such as entry 435. Entry 435 is then associated with logical processor 401.

However, if entry 430 and the new translation for logical processor 401 match, write logic 465 is to write entry 430 with bit 431 set to associate entry 430 with logical processor 401, as well as with logical processor 402 through bit 432. In one embodiment, bit 431 is set through masking a logical value, such as a logical one, into the bit position of bit 431 in entry 430. Note, that entry 430 may also be completely rewritten in entry 430's position or written to a new position, such as entry 440, with both bits set.

Figure 5:
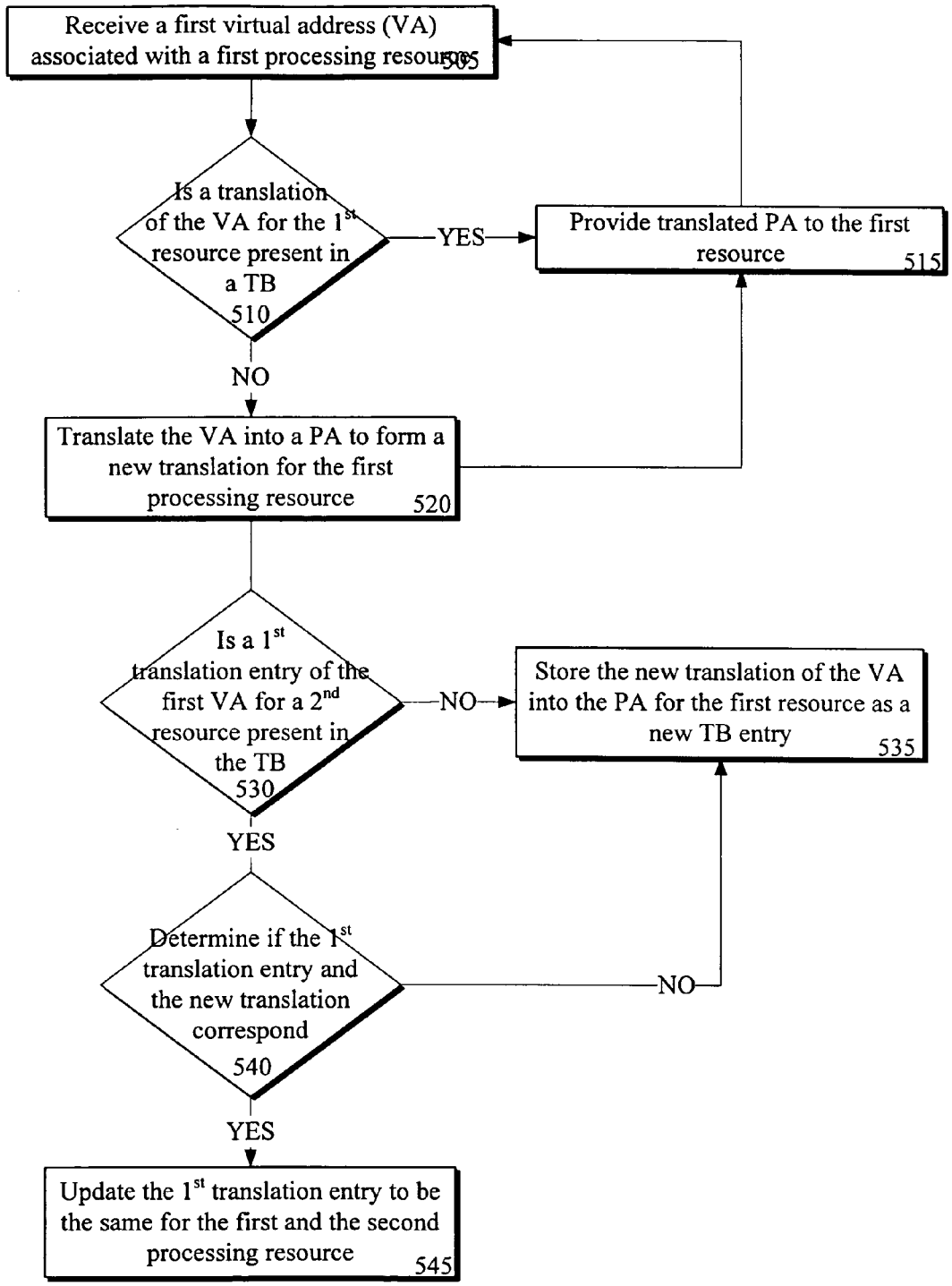
FIG. 5 illustrates an embodiment of a flow diagram of a method for sharing a translation buffer entry between a plurality of processing resources.

Turning to FIG. 5, an embodiment of a flow diagram for a method of sharing a translation buffer entry between a plurality of processing resources is illustrated. In flow 505 a first virtual address (VA) associated with a first processing resource is received. As stated above, the first processing resource includes any context, process, thread, and/or core that shares access to a translation buffer and potentially has a different virtual/linear view of physical memory. Previously, each processing resource is associated with separate entries and is tracked separately in a translation buffer; however, the flow illustrated demonstrates a capability of sharing entries of a translation buffer among any number of processing resources.

After receiving the first VA to be translated, it is determined in flow 510 if a translation of the first VA for the first resource is present in a translation buffer. Any search or read algorithm is potentially used to determine if an entry associated with the first processing resource including reference to the first VA. In a first embodiment, a number of bits or a value in a field of each entry designates which processing resources each entry is associated with. If a translation of the first virtual address for the first processing resource is present, then in flow 515, the translated physical address is provided to the first resource.

However, in flow 520, if a translation of the first VA for the first resource is not present, the first VA is translated into a first physical address (PA) for the first processing resource to form a new translation. As stated above, any translation method of a first address to a second address may be used. In one embodiment, the translation is done through a page table data structure utilizing a page table base register (PTBR) associated with the first processing resource.

In flow 530, it is determined if a first translation entry including reference to the first VA for a second processing resource is present. In one embodiment, determining if a first translation entry including reference to the first VA for a second processing resource is present includes attaching a second resource ID associated with the second resource to the virtual address and searching the translation buffer for the first translation entry. Essentially, the first resource ID is replaced by the second resource ID in a request to translate the first VA. Similar to searching the translation buffer for the first resource, the translation buffer is read for an entry including the first virtual address, which is associated with the second resource. Although, the diagram illustrates blocks in a reasonably linear fashion, each flow may occur in any manner. For example, the search for the first translation entry associated with the second resource may occur before or in parallel with the translation in flow 520.

If a first translation entry including a reference to the first VA associated with the second resource is not found, then in flow 535 the new translation of the first VA for the first resource is stored as a new translation buffer entry. In a sharing field, resource ID field, or other field the new TB entry is associated with the first resource.

Alternatively, if a first translation entry including a reference to the first VA associated with the second resource is found, then in flow 540, it is determined if the first translation entry corresponds to the new translation entry. In one embodiment, all of the first translation entry and the new translation, except for a sharing or resource ID field to associate the translations with a resource, are compared. If the entry and new translation do not match, i.e. the same virtual address references different physical addresses for the first and second resource, then, as above, in flow 535 the new translation is stored in a new translation buffer entry.

In contrast, if the first translation entry and the new translation match, then in flow 545, the new translation is stored in the translation buffer, which is associated with both the first and second resource. Storing of the new entry may also be referred to as storing a second entry. In one embodiment of storing a second entry, a separate new entry in the translation buffer is stored with a sharing field indicating the separate new second entry is associated with both resources. In another embodiment of storing a second entry, a value is set or masked into a sharing field of the existing first translation entry to form a new second translation entry in the same location of the translation buffer as the first translation entry with the sharing field indicating the second translation entry is associated with/shared between the first and second resource. Consequently, upon a subsequent request from either the first or second resource for a translation of the first VA, the second entry is provided.

As illustrated above, translation buffer entries are capable of being shared between resources. Previously, a translation buffer is capable of being shared either through partition or dedication of specific entries to individual resources. In that case, when translations for virtual addresses are the same for multiple threads, expensive translation may be done, even though, an accurate translation is already present for another resource. As discussed above, when translations of a virtual address are the same for multiple processing resources, entries storing recent translations may be shared between those multiple threads. This allows for one entry to service multiple resources/threads, instead of storing multiple entries for each thread. As a result, smaller translation buffers are able to obtain higher hit rates, while saving area, power and increasing translation time/circuit speed. In addition, sharing of entries is potentially implemented without software changes, while supporting finer sharing granularity. Furthermore, sharing is not limited to two processing resources, as a sharing field, which may be present in the content portion of a translation buffer or in an array indexing the content portion of a translation buffer, is capable of indicating any number of resources an entry is to be shared between.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
translating a first address, which is associated with a first processing resource, into a second translated address to form a new translation;
reading a translation buffer to determine if a first translation entry associated with a second processing resource references the first address;
determining if the new translation corresponds to the first translation entry associated with the second processing element, in response to determining the first translation entry references the first address; and
indicating in the translation buffer that the new translation is to be shared between the first and second processing resources in response to determining the new translation and the first translation entry correspond.

2. The method of claim 1, wherein the first address is a virtual address and the second translated address is a translated physical address.

3. The method of claim 2, wherein the first processing resource is associated with a first resource identification (ID) and the second processing resource is associated with a second resource ID, and wherein reading a translation buffer to determine if a first translation entry associated with a second processing resource references the first address comprises:
attaching the second resource ID associated with the second processing resource to the virtual address, and
searching the translation buffer for the first translation entry, the first translation entry including a matching virtual address associated with the attached second resource ID.

4. The method of claim 3, wherein the first and the second processing resources are each selected from a group consisting of a thread, a process, a context, a virtual machine, a logical processor, a hardware thread, a core, and a processor, and wherein the first and the second resource ID are each selected from a group accordingly consisting of a thread ID, a process ID, a context ID, a virtual machine ID, a logical processor ID, a hardware thread ID, a core ID, and a processor ID.

5. The method of claim 1, wherein the first translation entry and the new translation both further include an other value, and wherein determining the new translation corresponds to the first translation entry includes: determining the first address, the second translated address, and the other value for the new translation and the first translation entry match.

6. The method of claim 1, wherein indicating in the translation buffer that the new translation to be shared between the first and second processing resources comprises storing, in the translation buffer, the new translation in a new translation entry to be shared between the first and second resources, and wherein storing the new translation as a new translation entry to be shared between the first and second resources comprises:
storing the first address in a first address field of the new translation entry,
storing the second address in a second address field of the new translation entry,
setting a first bit in the new translation entry to represent the new translation entry is associated with the first processing resource, and
setting a second bit in the new translation entry to represent the new translation entry is associated with the second processing resource.

7. The method of claim 1, wherein indicating in the translation buffer that the new translation is to be shared between the first and second processing resources comprises: setting a second bit in the first translation entry, and wherein a first and the second bits in the second translation entry are to represent that the first translation entry is associated with the first and the second processing resource, accordingly.

8. The method of claim 7, wherein the first bit and the second bit are included in a resource identification (ID) field in the first translation entry.

9. The method of claim 8, wherein setting the second bit in the first translation entry to form the second translation entry includes masking a first logical value into the second bit location in the resource ID field of the first translation entry to form the second translation entry.

10. The method of claim 1, further comprising storing the new translation as a second translation entry to be associated with the first processing resource and not the second processing resource, in response to determining the first translation entry does not reference the first address or the new translation and the first translation entry do not correspond.

11. An apparatus comprising:
a microprocessor capable of executing a first thread and a second thread, the microprocessor including:
a translation buffer accessible by the first and the second threads, the translation buffer to store a plurality of translation entries, wherein a translation entry of the plurality of translation entries is to include:
a virtual address field to store a virtual address,
a physical address field to store a translated physical address corresponding to the virtual address; and
a sharing field to store a sharing value to represent the translation entry is to be shared between the first and the second threads in response to determining that the translation entry is the same for the first and the second threads.

12. The apparatus of claim 11, wherein the sharing field includes a first bit associated with the first thread and a second bit associated with the second thread, and wherein the first bit, when set, is to represent the translation entry is associated with the first thread, and a second bit, when set, is to represent the translation entry is associated with the second thread.

13. The apparatus of claim 12, wherein the sharing value includes the first and the second bit being set to represent the translation entry is associated with the first thread and the second thread.

14. The apparatus of claim 12, wherein the first and the second bits are included in a content portion of the translation buffer entry.

15. The apparatus of claim 14, wherein the first thread is associated with a first thread identifier (ID) and the second thread is associated with a second thread ID, and wherein the translation buffer further includes a decoder to take a first thread ID as an input and associate the first thread ID with the first bit and to take the second thread ID as an input and associate the second thread ID with the second bit.

16. The apparatus of claim 12, wherein the first and the second bits are included in a tag array portion of the translation buffer entry.

17. A system comprising:
a microprocessor including
a first and a second logical processor;
a translation buffer accessible by the first and the second logical processor, the translation buffer including a first translation entry, wherein the first translation entry comprises,
a sharing field to store a first bit and a second bit, the first bit, when in a first logical state, to represent the first translation entry is associated with the first logical processor and the second bit, when in the first logical state, to represent the first translation entry is associated with the first logical processor,
a virtual address field to store a first virtual address, and
a physical address field to store a first physical address translated from the first virtual address; and
a system memory coupled to the microprocessor to store elements at a plurality of physical address locations, wherein the first physical address translated from the first virtual address is one of the plurality of physical address locations.

18. The system of claim 17, wherein the microprocessor further comprises:
miss logic to determine a miss, which is associated with the first logical processor, to the translation buffer occurs, in response to receiving the first virtual address associated with the first logical processor and the first virtual address is not stored in any virtual address fields of the translation buffer with the first bit of a corresponding sharing field set to the first logical state;
translation logic to translate the first virtual address into a second physical address for the first logical processor, in response to the miss associated with the first logical processor;
read logic to read the translation buffer, in response to the miss associated with the first logical processor, to determine the first translation entry includes the first virtual address for the second logical processor in the first translation entry, if the second bit of the sharing field is set to the first logical state;
comparison logic to determine the translation of the first virtual address for the first logical processor and the translation of the first virtual address for the second logical processor stored in the first translation entry are the same, if the first and second physical addresses match; and
write logic to write the first translation entry with the first and second bit of the sharing field set to the first logical state, in response to the comparison logic determining the translation of the first virtual address for the first logical processor and the translation of the first virtual address for the second logical processor stored in the first translation entry are the same.

19. The system of claim 18, wherein the microprocessor further comprises: a first page table base register to store a first base address for a virtual memory space of the first logical processor, which includes the first virtual address, and a second page table base register to store a second base address for a virtual memory space of the second logical processor, which includes the first virtual address.

20. The system of claim 18, wherein write logic to write the first translation entry with the first and second bit of the sharing field set to the first logical state comprises: mask logic to mask the first bit to the first logical state.

21. The system of claim 17, wherein the microprocessor further comprises:
a decoder to output the first logical state on a first decoder output in response to receiving a first logical processor ID associated with the first logical processor and to output the first logical state on a second decoder output in response to receiving a second logical processor ID associated with the second logical processor;
a first logical operator coupled to the decoder and to the first bit in the first translation entry, the first logical operator to output the first logical state on a first logical operator output in response to the first decoder output and the first bit being in the first logical state;

a second logical operator coupled to the decoder and to the second bit in the first translation entry, the second logical operator to output the first logical state on a second logical operator output in response to the second decoder output and the second bit being in the first logical state;

a third logical operator coupled to the first and the second logical operator, the third logical operator to output the first logical state on a third logical operator output in response to the first logical operator output or the second logical operator output being in the first logical state; and a fourth logical operator coupled to the third logical operator and the virtual address field to enable a read out of the translation entry in response to the third logical operator output being in the first logical state and a received virtual address matching the first virtual address.

22. The system of claim 17, wherein the microprocessor further comprises:

a first page table base register to store a first base address for a virtual memory space of the first logical processor;

a second page table base register to store a second base address for a virtual memory space of the second logical processor; and translation logic to translate the first virtual address into the first physical address for the first logical processor based on the first base address and for the second logical processor based on the second base address.

* * * * *

UNITED STATES PATENT AND TRADEMARK OFFICE
CERTIFICATE OF CORRECTION

Page 1 of 1

PATENT NO.        : 8,645,666 B2
APPLICATION NO.   : 11/647894
DATED             : February 4, 2014
INVENTOR(S)       : Andy Glew It is certified that error appears in the above-identified patent and that said Letters Patent is hereby corrected as shown below:

In the Drawings

On sheet 1 of 5, FIG. 1, line 4, Box 130 delete "Allocater" and insert -- Allocator --, therefor.

Signed and Sealed this
Sixteenth Day of September, 2014

Michelle K. Lee
*Deputy Director of the United States Patent and Trademark Office*